D. K. MORRIS & G. A. LISTER.
ELECTRIC SWITCH, CIRCUIT BREAKER, AND THE LIKE.
APPLICATION FILED MAR. 23, 1912.

1,071,566.

Patented Aug. 26, 1913.
3 SHEETS—SHEET 1.

WITNESSES
Sidney Brooks
J. P. Davis

INVENTORS
David King Morris
George Anslow Lister
BY
ATTORNEYS

D. K. MORRIS & G. A. LISTER.
ELECTRIC SWITCH, CIRCUIT BREAKER, AND THE LIKE.
APPLICATION FILED MAR. 23, 1912.

1,071,566.

Patented Aug. 26, 1913.

3 SHEETS—SHEET 3.

WITNESSES
Sidney Brooks
J. P. Davis

INVENTORS
David King Morris
George Anslow Lister
BY Munn & Co
ATTORNEYS

UNITED STATES PATENT OFFICE.

DAVID KING MORRIS AND GEORGE ANSLOW LISTER, OF COVENTRY, ENGLAND, ASSIGNORS TO MORRIS & LISTER LIMITED, OF COVENTRY, ENGLAND.

ELECTRIC SWITCH, CIRCUIT-BREAKER, AND THE LIKE.

1,071,566.  Specification of Letters Patent.  Patented Aug. 26, 1913.

Application filed March 23, 1912. Serial No. 685,713.

*To all whom it may concern:*

Be it known that we, DAVID KING MORRIS, Ph. D., and GEORGE ANSLOW LISTER, B. Sc., subjects of the King of Great Britain, residing at Carlton Works, Lockhurst Lane, Coventry, in the county of Warwick, England, engineers, have invented certain new and useful Improvements Relating to Electric Switches, Circuit-Breakers, and the Like, of which the following is a specification.

This invention relates to switches or circuit breakers of the thermal type, and has for its object to provide improved means for liberating the switch or the like.

The invention comprises the combination with a tension member adapted to be heated by a current passing through or around it and means for retaining the switch or the like in the closed position, of a spring or equivalently controlled oscillatory strut like member on which the tension member is adapted to exert or modify an approximately end-on pressure and which can move through a certain angular distance on either side of a dead center (where the force exerted by the tension member is directly along the principal axis of the strut like member); the arrangement of the parts being such that the strut like member normally secures the switch in the operative position, but when the tension member is sufficiently heated or cooled the strut like member can swing into a position on the opposite side of its dead center and thereby release the switch.

The invention also comprises the arrangement with the strut like member and switch retaining means of a handle as hereinafter described.

Figure 1:
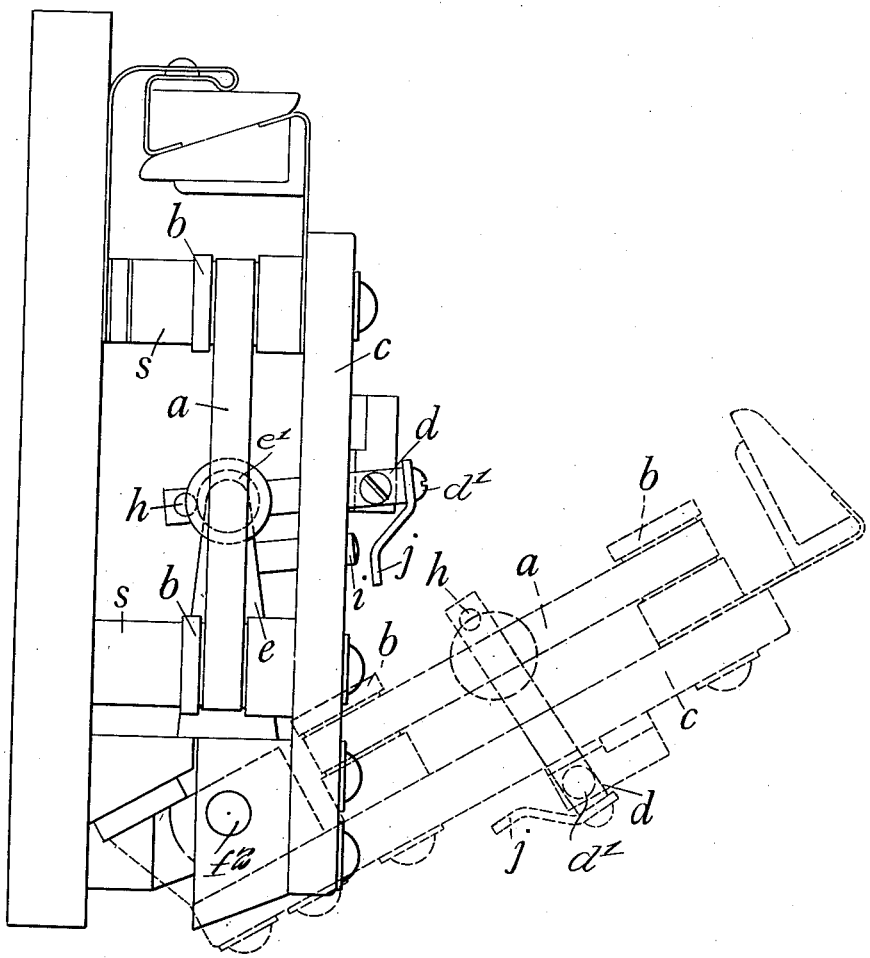
Figure 2:
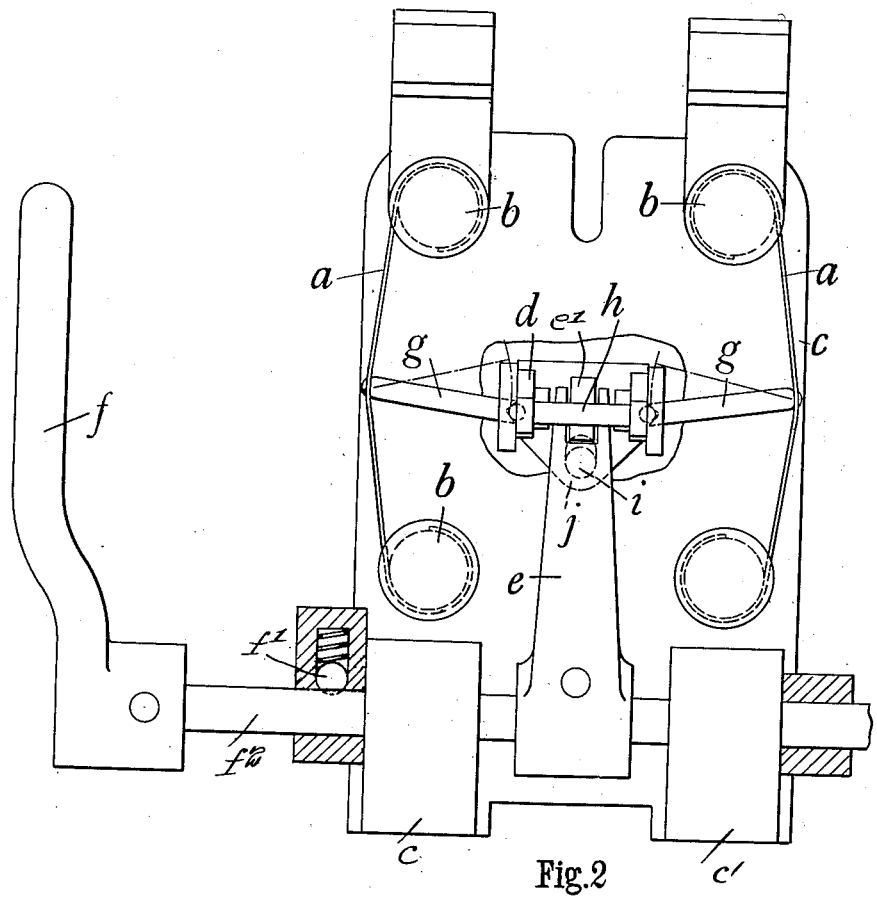
Figure 3:
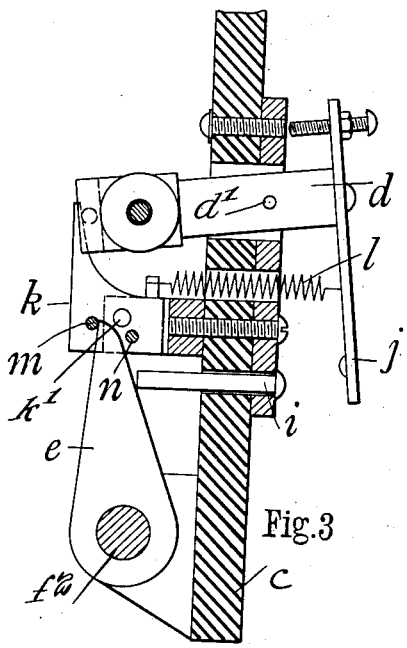
Figure 4:
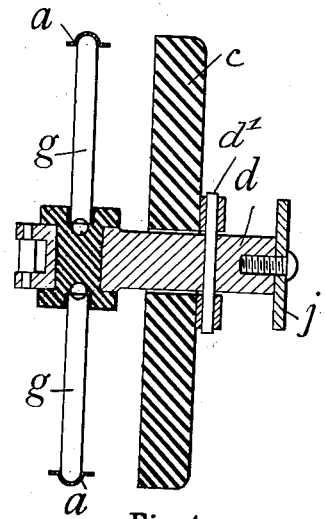
Figure 5:
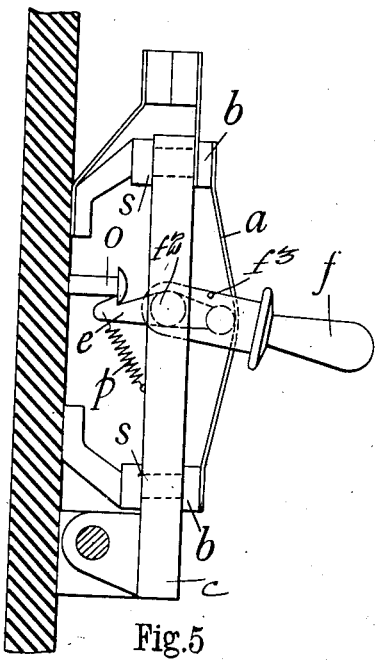
Figure 6:
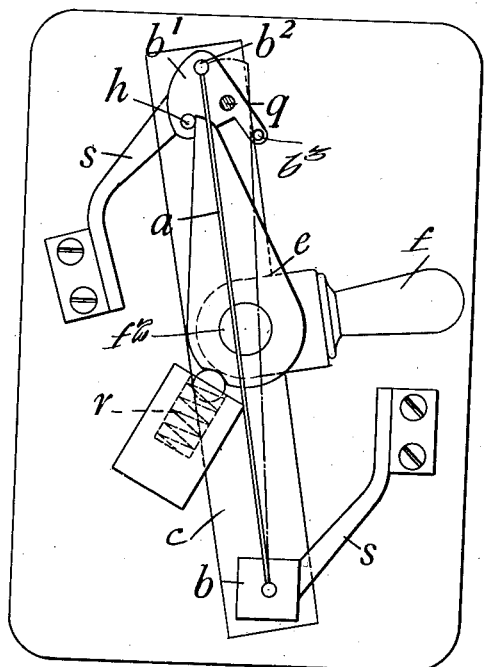

Referring to the three accompanying sheets of explanatory drawings: Figures 1 and 2 are respectively side and rear elevations of a switch having this invention applied thereto. Figs. 3 and 4 are sectional side elevation and sectional plan showing a portion of a modified form of such switch. Figs. 5 and 6 illustrate by side elevation and rear elevation respectively two further modified forms.

The same reference letters in the different views indicate the same or similar parts.

In carrying this invention into effect as shown in Figs. 1 and 2, a pair of tension strips $a$ connecting together the movable contacts $b$ on the switch arm $c$ which is made of insulating material are deflected in an outward direction at their central portion, and between such portions a forked catch or retaining lever $d$ (or lever formed from a pair of side members) is pivoted on the front end of the switch arm $c'$. The said lever is adapted to coöperate with an actuating lever $e$ connected to a handle $f$, which latter (i. e. $e$ and $f$) are secured in the closed position for example, by a spring catch $f'$, acting on the spindle $f^2$ of the handle $f$ and lever $e$. Between each side of the catch lever $d$ and the adjacent tension strip is mounted a strut piece $g$ which is hinged or adapted to abut in recesses in the sides of the said parts and is capable of swinging through a certain distance on either side of a line perpendicular to a chord joining the ends of the tension strip.

Assuming the catch lever aforementioned and the actuating lever to be engaged as shown, the strut on each side of the catch lever is in such an angular position that it retains the cross pin $h$ on the catch lever in engagement with the actuating lever under the action of the thrust imposed on it by the tension member. The said engagement is effected by the abutment of the pin $h$ against the roller $e'$ on the lever $e$. The switch arm can therefore be closed and held in the closed position by the spring catch $f'$ above mentioned. In the event of the thermal elements being sufficiently extended by the current passing through or around them, the pressure on the ends of the struts becomes sufficiently relieved to permit the catch lever to be swung by any convenient spring, which is preferably concealed, and coiled around the spindle $f^2$ in the bases $c'$, whereby the arm $c$ is carried on said spindle, out of engagement with the actuating lever, so that the switch arm is thereby released and permitted to be opened by the usual springs, which are preferably concealed, and coiled about the spindle $f^2$ in the bosses $c'$ whereby the arm $c$ is carried on said spindle. During such movement of the catch lever each strut is swung to the opposite side of its dead center as indicated by the dotted lines in Fig. 2, and in consequence the catch lever cannot automatically resume its operative position, but requires to be moved thereto by the attendant. For conveniently effecting restoration of the catch lever a projection $i$ on the actuating lever may be arranged to impart the desired motion to the catch lever through an abutment plate $j$ when a movement into the open position is given to the actuating lever. In Fig. 2 the arm $e$ is broken away around the lever $d$ to show the latter and the plate $j$ more clearly. By employing a separate pair of contacts with each of a pair of thermal elements, and insulating the said contacts from each other, a simple form of double pole switch can be produced as illustrated at Figs. 1 and 2.

In carrying out the invention a large variety of different arrangements of the tension and strut members and switch retaining means may be utilized. Further, the invention is not limited to loose handle circuit breaking devices as it is equally applicable to other forms of such apparatus.

Referring to the modified forms shown in the drawings, the arrangement illustrated in Figs. 3 and 4 is similar to that in Figs. 1 and 2 excepting that provision is made for preventing violent impact of the actuating lever against the catch lever when the actuating lever is suddenly operated. Between the two levers is interposed a connecting lever $k$ which is pivoted at $k'$ to the switch arm and is attached to the abutment plate $j$ by a spring $l$. The switch arm is held in the closed position by the engagement of the lever $e$ with a pin $m$ on the lever $k$. When, however, the catch lever is moved to the opposite side of its dead center as above described, the lever $k$ is withdrawn by the spring $l$ from the lever $e$ and the switch arm is at liberty to be swung into the open position. Restoration of the levers $d$, $e$ and $k$ is effected by pressure of the lever $e$ on the plate $j$ through the pin $i$, the said lever $e$ being at the same time caused to swing the lever $k$ back against the action of its spring by abutment against a pin $n$.

In the arrangement diagramatically shown in Fig. 5, a pair of contacts are connected by a single strip $a$ and on the switch arm is pivoted a handle $f$ connected to a lever $e$ which at one end can engage a projection $o$ and at the other end is held by contact with the strip. When the strip expands the pressure which normally holds the catch in its operative position is released and the catch is withdrawn from the projection $o$ by the spring $p$. The switch arm can then open. Before reclosing the switch the catch is returned to its operative position by the handle through the medium of a peg $f^3$ which can be pressed by the handle against the upper side of the lever $e$.

In the arrangement shown diagrammatically in Fig. 6, a pair of contacts $b'$ are mounted on the opposite ends of a lever $e$ which is loosely pivoted at its center on the same shaft $f^2$ as the lever $e$, and is indicated by dotted lines. On one of the contacts (e. g. the upper one) is pivoted a rocking element $b'$, to a pin $b^2$ on which is connected the extensible strip $a$ whose other end is secured to the other contact $b$. The rocking element can move on the pivot $q$, and can be engaged by the lever $e$ through the pin $h$. The lever $d$ is operated by a handle $f$ fixed to the same shaft $f^2$ as the lever $e$. In the position of the parts shown in the figure, the switch is closed. When the strip expands the element $b'$ can be rocked by a spring (preferably coiled around the pivot) so that the strip occupies the position shown by the dotted line, and in moving into this position the pin $h$ is withdrawn from the lever $e$ so that the switch arm is left free to be swung into the open position by a spring coiled around the shaft $f^2$. Restoration of the lever $e$ to its operative position is effected by moving it backward until it takes up the required position behind the pin $h$, the part $b'$ being restored to the original position by any convenient means, such as a peg $b^3$ against which the rear side of the lever $e$ can be made to abut under the action of the handle $f$. The ball and spring device $r$ is one form of catch which may be conveniently used for acting on the lever $e$ to retain the switch arm in the closed position. In this construction the portion of the movable part $b'$ which lies between the point of attachment of the strip and the pivot $q$ corresponds to the strut which, as herein stated, is always required in conjunction with the tension member.

The fixed contacts in the switches shown are denoted by $s$. It will be understood that in the construction of the switches any suitable installation of the parts may be adopted. All the springs required and mentioned are not illustrated as these may be of various forms and arrangements.

Having thus described our invention what we claim as new and desire to secure by Letters Patent is:—

1. In a device of the class described, the combination with a tension member adapted to be heated and extended by a current and means for retaining the switch in the closed position, of an oscillatory strut like member on which the said tension member is adapted to exert or modify an approximately end-on pressure and which can move through a certain angular distance on either side of a dead center, the said strut member being adapted normally to secure the switch in the operative position but to swing into a position on the opposite side of its dead center and thereby release the switch when the tension member is sufficiently varied, substantially as described.

2. In a device of the class described, the combination comprising a tension member adapted to be heated and extended by a current, an oscillatory strut like member adapted to occupy a position on either side of a dead center and to keep the switch closed under the action of the said tension member when in one of said positions, and a spring whereby the strut member is moved into the other of the said positions for releasing the switch when the temperature of the tension member is sufficiently varied, substantially as described.

3. In a device of the character described, the combination comprising a pair of tension elements, a switch retaining lever, and toggle like pieces interposed between said elements and lever, substantially as described.

4. In a device of the character described, the combination comprising a pair of tension elements, a switch retaining lever, toggle like pieces interposed between said elements and lever, and an operating lever adapted to be engaged by said retaining lever, substantially as described.

5. In a device of the character described, the combination comprising a pair of tension elements, a switch retaining lever, toggle like pieces interposed between said elements and lever, an operating lever adapted to be engaged by said retaining lever, and a projection on the operating lever and an abutment on the retaining lever for restoring the retaining lever to its operative position by actuation of the operating lever, substantially as described.

6. In a device of the character described, the combination comprising a pair of tension elements, a switch retaining lever, toggle like pieces interposed between said elements and lever, an operating lever adapted to be engaged by said retaining lever, a connecting lever between the operating and retaining levers, and a spring between said connecting and retaining levers, substantially as described.

7. In a device of the character described, the combination with a switch arm, a pair of contacts thereon and a pair of tension elements connecting said contacts, of an operating lever pivoted co-axially with the arm and capable of moving independently thereof, a retaining lever pivoted on said arm, toggle like pieces between said tension elements and the retaining lever, a spring for rocking the retaining lever when released by the tension elements, and a projection on the operating lever and an abutment on the retaining lever for restoring the retaining lever to its operative position by actuation of the operating lever, substantially as described.

In testimony whereof we have signed our names to this specification in the presence of two subscribing witnesses.

DAVID KING MORRIS.
GEORGE ANSLOW LISTER.

Witnesses:
JOHN MORGAN,
FRANCIS MALPAC.